(12) United States Patent
Bachrach et al.

(10) Patent No.: US 10,503,834 B2
(45) Date of Patent: Dec. 10, 2019

(54) TEMPLATE GENERATION FOR A CONVERSATIONAL AGENT

(71) Applicant: DIGITAL GENIUS LIMITED, London (GB)

(72) Inventors: Yoram Bachrach, London (GB); Andrej Žukov Gregorič, London (GB); Samuel John Coope, London (GB); Jose Marcos Rodríguez Fernández, London (GB); Pavel Minkovsky, Berkeley, CA (US); Bohdan Maksak, London (GB)

(73) Assignee: Digital Genius Limited, London (GB)

( * ) Notice: Subject to any disclaimer, the term of this patent is extended or adjusted under 35 U.S.C. 154(b) by 0 days.

(21) Appl. No.: 15/816,282

(22) Filed: Nov. 17, 2017

(65) Prior Publication Data

US 2019/0155905 A1    May 23, 2019

(51) Int. Cl.
   *G06F 17/27* (2006.01)
   *G10L 25/30* (2013.01)
   *G06F 17/24* (2006.01)

(52) U.S. Cl.
   CPC ........ *G06F 17/2785* (2013.01); *G06F 17/248* (2013.01); *G06F 17/277* (2013.01); *G10L 25/30* (2013.01)

(58) Field of Classification Search
   CPC .. G06F 17/2785; G06F 17/248; G06F 17/277; G10L 25/30
   See application file for complete search history.

(56) References Cited

U.S. PATENT DOCUMENTS 6,771,746 B2    8/2004   Shambaugh et al.
7,747,649 B2 *  6/2010   Benson ............... H04L 67/02
                                                    707/791

(Continued)

FOREIGN PATENT DOCUMENTS

CN    107330130 A    11/2017

OTHER PUBLICATIONS

Yao et al., "Attention with Intention for a Neural Network Conversation Model," NIPS Workshop on Machine Learning for Spoken Language Understanding and Interaction, Nov. 5, 2015. (Year: 2015).*

(Continued)

*Primary Examiner* — Michelle M Koeth
(74) *Attorney, Agent, or Firm* — EIP US LLP

(57) ABSTRACT

Certain examples are described that provide methods and systems for generating templates for use by a conversational agent. These examples enable a natural language interface to be provided. Certain examples cluster user and agent messages from a corpus of text data representing text dialogues. This clustering enables response templates to be generated in a way that takes into account a context in which responses are given. In certain examples, messages that are exchanged between a user and a conversational agent are embedded as numeric arrays based a neural sequence-to-sequence model. Clustering routines are used to group dialogue encodings into one or more response clusters, and these clusters may then be used to generate response templates. The response templates may be used by a conversational agent to prepare a response to a user message.

13 Claims, 9 Drawing Sheets

(56) References Cited

U.S. PATENT DOCUMENTS

| | | | |
|---|---|---|---|
| 9,473,637 B1 | 10/2016 | Venkatapathy et al. | |
| 9,804,752 B1 | 10/2017 | Mall | |
| 2002/0111811 A1 | 8/2002 | Bares et al. | |
| 2005/0105712 A1 | 5/2005 | Williams et al. | |
| 2012/0278091 A1* | 11/2012 | Yaseen | G06Q 30/0202 705/1.1 |
| 2015/0178371 A1 | 6/2015 | Seth et al. | |
| 2015/0294670 A1 | 10/2015 | Roblek et al. | |
| 2015/0331849 A1 | 11/2015 | Porat | |
| 2017/0118336 A1* | 4/2017 | Tapuhi | H04M 3/4938 |
| 2017/0277667 A1 | 9/2017 | Weston et al. | |
| 2018/0150744 A1 | 5/2018 | Orr et al. | |

OTHER PUBLICATIONS

Chollet, "A ten-minute introduction to sequence-to-sequence learning in Keras," The Keras Blog, Sep. 29, 2017, accessible at https://blog.keras.io/a-ten-minutes-introduction-to-sequence-to-sequence-learning-in-keras.html (last accessed Feb. 13, 2019) Year: (2017).*
Ranzato et al., "Sequence Level Training with Recurrent Neural Networks," ICLR 2016, May 6, 2016 (Year: 2016).*
https://en.wikipedia.org/wiki/Question_answering, 2018.
http://www.ardendertat.com/2011/07/17/how-to-implement-a-search-engine-part-3-ranking-tf-idf/, 2011.
https://web.stanford.edu/class/cs276/handouts/lecture6-tfidt.ppt, 2011.
An Attention Mechanism for Neural Answer Selection Using a Combined Global and Local View Yoram Bachrach, et al.—https://arxiv.org/pdf/1707.01378.pdf Sep. 20, 2017.
Bachrach et al.: Contextual Clustering of Customer Requests and Agent Responses in Conversations; Sep. 5, 2017.
Stephen Robertson and Hugo Zaragoza: "The Probabilistic Relevance Framework, Bm25 and Beyond"; Foundations and Trends (R) in Information Retrieval vol. 3, No. 4 (2009) 333-389.
Tian Zhang, et al.: "BIRCH: An Efficient Data Clustering Method for Very Large Databases" SIGMOD '96 Proceedings of the 1996 ACM SIGMOD international conference on Management of data pp. 103-114—Montreal, Quebec, Canada—Jun. 4-6, 1996.
Rui Xu and Donald C. Wunsch: "Survey of Clustering Algorithms"; Missouri University of Science and Technology Scholar's Mine, IEEE Transactions on Neural Networks, vol. 16, No. 3 dated May 1, 2005.
Paul J. Werbos:"Backpropagation Through Time: What It Does and How to Do It"; Proceedings of the IEEE, vol. 78, No. 10, Oct. 1990 pp. 1550-1560.
Oriol Vinyals and Quoc V. Le: "A Neural Conversational Model"; Proceedings of the 31st International Conference on Machine Learning. Lille, FR JMLR: W&CP vol. 37; 22 arXiv: 1506.05869. Submitted Jun. 19, 2015 and revised Jul. 22, 2015.
Ilya Sutskever et al.: "Sequence to Sequence With Neural Networks"; Dec. 14, 2014 arXiv:1409.3215v3 [cs.CL].
Stephen Robertson: "Understanding Inverse Document Frequency: On Theoretical Arguments for IDF"; Journal of Documentation 60 No. 5, pp. 503-520.
Jeffrey Pennington et al.: "GloVe: Global Vectors for Word Representation"; Proceedings of the 2014 Conference on Empirical Methods in Natural Language Processing (EMNLP), pp. 1532-1543; Oct. 25-29, 2014 Doha, Qatar.
F. Murtagh: "A Survey of Recent Advances in Hierarchical Clustering Algorithms"; The Computer Journal, vol. 26, No. 4, 1983 downloaded from https://academic.oup.com/comjnl/article-abstract/26/4/354/377434.
Tomas Mikolov et al.: "Distributed Representations of Words and Phrases and Their Compositionality"; Oct. 16, 2013 arXiv:1310.4546 [cs.CL].
Tomas Mikolov et al.: "Efficient Estimation of Word Representations in Vector Space"; arXiv:1301.3781v3 [cs:CL]submitted Jan. 16, 2013 and revised Sep. 7, 2013.
Stephen C. Johnson; "Hierarchical Clustering Schemes"; Bell Telephone Laboratories, Murray Hill, New Jersey; Psychometrika vol. 32, No. 3, Sep. 1967.
A.K. Jain et al.: "Data Clustering—A Review" ACM Computing Surveys (CSUR) Surveys Homepage archive vol. 31 Issue 3, Sep. 1999 pp. 264-323.
J.A. Hartigan and M.A. Wong "Algorithm AS 136:A K-Means Clustering Algorithm" Wiley-Blackwell Journal of the Royal Statistical Society. Series C (Applied Statistics), vol. 28, No. 1 1979 pp. 100-108.
Sepp Hochreiter et al.: "Long Short-Term Memory"; Neural Computation 9 (1997), pp. 1735-1780.
William B. Frakes ad Ricardo Baeza-Yates: "Information Retrieval—Data Structures and Algorithms"; Book Prentice-Hall, Inc. Upper Saddle River, NJ, USA ©1992.
Brian S. Everitt et al.: "Cluster Analysis, 5th Edition"; Book, Wiley Series in Probability and Statistics, 2011.
Martin Ester et al.: "A Density-Based Algorithm for Discovering Clusters, A Density-Based Algorithm for Discovering Clusters in Large Spatial Databases with Noise"; KDD Proceedings 1996 pp. 226-231.
Junyoung Chung et al.: "Empirical Evaluation of Gated Recurrent Neural Networks on Sequence Modeling"; Dec. 11, 2014 arXiv:1412.3555v1 [cs.NE].
James C. Bezdek et al.: "FCM: The Fuzzy c-Means Clustering Algorithm"; Computers & Geosciences vol. 10, No. 2-3, 1984 pp. 191-203.
Dzmitry Bahdanau et al.: "Neural Machine Translation by Jointly Learning to Align and Translate"; Conference paper at ICLR 2015; May 19, 2016 arXiv:1409.0473v7 [cs.CL].
Pavel Berkhin: "A Survey of Clustering Data Mining Techniques" Aug. 2002.
Charu C. Aggarwal et al.: "A Survey of Text Clustering Algorithms"; Mining Text Data, Chapter 4, DOI 10.1007/978-1-4614-3223-4_4; Springer Science + Business Media, LLC 2012 pp. 77-128.
Charu C. Aggarwal and Chandan K. Reddy: "Data Clustering—Algorithms and Applications"; Book, CRC Press, Taylor & Francis Group 2014.
"Gaunt et al: ""Training Deep Neural Nets to Aggregate Crowdsourced Responses"" UAI '16 Proceedings of the Thirty-SecondConference on Uncertainty in ArtificialIntelligence pp. 242-251".
Kaisheng Yao et al: "Attention with Intention for a Neural Network Conversation Model" CORR (ARXIV) vol. 1510.08565v3.
Yoram Bachrach et al: "An Attention Mechanism for Answer Selection Using a Combined Global and Local View", Sep. 20, 2017.
Extended European Search Report dated May 24, 2018 for EP Application No. 17202427.5.
Vinyals, Oriol and Le, Quoc. A neural conversational model. arXiv preprint arXiv: 1506.05869. Submitted Jun. 19, 2015 and revised Jul. 22, 2015.
Mikolov, Tomas et al., "Efficient Estimation of Word Representations in Vector Space", arXiv: 1301.3781 submitted Jan. 16, 2013 and revised Sep. 7, 2013.
2014 paper GloVe: Global Vectors for Word Representation by Jeffrey Pennington, Richard Socher, and Christopher D. Manning URL: https://nlp.stanford.edu/pubs/glove.pdf.
Siamese Recurrent Architectures for Learning Sentence Similarity by Jonas Mueller and Aditya Thyagarajan, Proceedings of the Thirtieth AAAI Conference on Artificial Intelligence (AAAI-16) Phoenix, Arizona—Feb. 12-17, 2016.
Ko et al. "A Probabilistic Framework for Answer Selection in Question Answering", HLT-NAACL. 2007.
Serban et al.; "A Deep Reinforcement Learning Chatbot (Short Version)", arxiv.org, Cornell University Library, 201 Olin Library Cornell University Ithaca, NY 14853, Jan. 20, 2018 (Jan. 20, 2018), XP080853426, sections 2-4.
Kandasamy et al.;"Batch Policy Gradient Methods for Improving Neural Conversation Models", arxiv.org, Cornell University Library, 201 Olin Library Cornell University Ithaca, NY 14853, Feb. 10, 2017 (Feb. 10, 2017), XP080747453 Sections I, 2, 3 and 4.

(56) References Cited

OTHER PUBLICATIONS

European Search Report dated Sep. 10, 2018 for Application No. EP 18156147.3.
European Search Report dated Jul. 17, 2018 for Application No. EP 18154538.5.
United States Non-Final Office action dated Feb. 25, 2019 for U.S. Appl. No. 15/893,273.

* cited by examiner

TEMPLATE GENERATION FOR A CONVERSATIONAL AGENT

BACKGROUND

Field of the Disclosure

The present disclosure relates to computing systems, and, in particular, methods and systems for processing text data that is exchanged between computing devices. Certain examples relate to template generation for a conversational agent to at least partially automate replies to messages submitted by user devices. Certain examples seek to improve user-computer interfacing.

Description of the Related Technology

Many users of computing devices prefer to interact with computing systems using natural language, e.g. words and sentences in the user's native language, as opposed to more restrictive user interfaces (such as forms) or using specific programming or query languages. For example, users may wish to ascertain a status of a complex technical system, such as a transport control system or a data center, or be provided with assistance in operating technical devices, such as embedded devices in the home or industry. Natural language interfaces also provide a much larger range of potential queries. For example, users may find that structured queries or forms do not provide options that relate to their particular query. This becomes more of an issue as computing systems increase in complexity; it may not be possible to enumerate (or predict) all the possible user queries in advance of operation.

To provide a natural language interface to users, conversational agents have been proposed. These include agents sometimes known colloquially as "chatbots". In the past, these systems used hand-crafted rules to parse user messages and provide a response. For example, a user query such as "Where is the power button on device X?" may be parsed by looking for string matches for the set of terms "where", "power button" and "device X" in a look-up table, and replying with a retrieved answer from the table, e.g. "On the base". However, these systems are somewhat limited; for example, the user message "I am looking for the on switch for my X" would not return a match and the conversational agent would fail to retrieve an answer.

To improve conversational modelling, a neural conversation model has been proposed to provide a conversational agent, e.g. as in the following document. VINYALS, Oriol and LE, Quoc. A neural conversational model. arXiv preprint arXiv:1506.05869. Submitted 19 Jun. 2015. In this neural conversation model, a sequence-to-sequence framework is used to generate short machine replies to user-submitted text. The model uses a data driven approach, rather than a rule-based approach. While the neural conversation model generates replies that are rated more useful than a comparative rule-based system, the authors admit that their model still has limitations. For example, the conversational agent only gives short and simple answers, which may not always address a user's query. Additionally, the authors found that replies were often inconsistent, e.g. if semantically similar user queries with differing text data were submitted, the conversational agent would provide inconsistent (i.e. differing) answers. Neural conversation models such as in the above paper have been found to be difficult to implement as practical user interfaces in the real-world, e.g. due to the aforementioned issues.

Accordingly, there is a desire to improve user-computing interfaces to enable users to submit natural language queries and to provide these interfaces in a practical and implementable manner. By improving user-computing interfaces in this manner it may be possible to efficiently provide responses to a large number of user queries, e.g. which are received concurrently.

SUMMARY

Aspects of the present disclosure are set out in the appended independent claims. Certain variations of the present disclosure are set out in the appended dependent claims.

Further features and advantages will become apparent from the following description of preferred embodiments, given by way of example only, which is made with reference to the accompanying drawings.

In some embodiments, a computer-implemented method for generating response templates for a conversational agent is provided. The method includes obtaining historical data representing a plurality of text dialogues. Each text dialogue includes a sequence of messages exchanged between a user and a conversational agent. Each message includes text data. The method includes training a neural sequence-to-sequence model using the historical data. The neural sequence-to-sequence model includes an encoder and a decoder. The encoder receives a sequence of tokens as an input and encodes the sequence of tokens as a numeric array. The decoder receives the numeric array and generates a sequence of tokens as an output. The training includes, for a given text dialogue, supplying text from a dialogue prefix as the input to the neural sequence-to-sequence model. The dialogue prefix includes at least a subset of the sequence of messages in the given text dialogue. The training includes, for the given text dialogue, supplying text from a next message following the dialogue prefix as a ground truth for comparison with the output of the neural sequence-to-sequence model. The method includes generating dialogue encodings for agent response messages within the plurality of text dialogues using at least dialogue prefix encodings output by the encoder of the trained neural sequence-to-sequence model. The method includes applying a clustering routine to group the plurality of dialogue encodings into one or more response clusters. The method includes selecting a representative dialogue encoding for each cluster. The method includes storing message text from the agent response messages associated with each representative dialogue encoding as a response template. The response templates are supplied to a conversational agent for use in generating an agent response message during a text dialogue.

In some embodiments, a system for implementing a text dialogue is provided. The system includes a conversational agent including at least a processor and a memory to receive one or more user messages from a client device over a network and send agent messages in response to the one or more user messages. The system includes a template database including response templates for use by the conversational agent to generate agent messages. The system includes a dialogue database including historical data representing a plurality of text dialogues. Each text dialogue includes a sequence of messages exchanged between a user and a conversational agent. Each message includes text data. The system includes a trained sequence-to-sequence model including an encoder and a decoder. The encoder receives a sequence of tokens as an input and encodes the sequence of tokens as a numeric array. The decoder receives the numeric array and generates a sequence of tokens as an output. The sequence-to-sequence model is trained using text from a dialogue prefix as the input. The dialogue prefix includes at least a subset of the sequence of messages in a given text dialogue, and text from a next message following the dialogue prefix as a ground truth for comparison with the output. The system includes a dialogue encoding generator including at least a processor and a memory to generate a dialogue encoding for agent response messages within the plurality of text dialogues using at least dialogue prefix encodings output by the encoder of the trained neural sequence-to-sequence model. The system includes a clustering engine including at least a processor and a memory to group the plurality of dialogue encodings into one or more response clusters and output a representative dialogue encoding for each response cluster. The system includes a response template generator including at least a processor and a memory to receive representative dialogue encodings for the one or more response clusters and to store message text from the agent messages associated with each representative dialogue encoding as a response template in the template database.

In some embodiments, a non-transient, computer-readable medium comprising computer program instructions is provided. The computer program instructions, when executed, cause a processor to obtain historical data representing a plurality of text dialogues. Each text dialogue includes a sequence of messages exchanged between a user and a conversational agent. Each message includes text data. The computer program instructions, when executed, cause the processor to train a neural sequence-to-sequence model using the historical data. The neural sequence-to-sequence model includes an encoder and a decoder. The encoder receives a sequence of tokens as an input and encodes the sequence of tokens as a numeric array. The decoder receives the numeric array and generates a sequence of tokens as an output. The instructions include instructions to, for a given text dialogue, use text from a dialogue prefix as the input to the neural sequence-to-sequence model. The dialogue prefix includes at least a subset of the sequence of messages in the given text dialogue. The instructions include instructions to, for the given text dialogue, use text from a next message following the dialogue prefix as a ground truth for comparison with the output of the neural sequence-to-sequence model. The computer program instructions, when executed, cause the processor to generate dialogue encodings for agent response messages within the plurality of text dialogues using at least dialogue prefix encodings output by the encoder of the trained neural sequence-to-sequence model. The computer program instructions, when executed, cause the processor to apply a clustering routine to group the plurality of dialogue encodings into one or more response clusters. The computer program instructions, when executed, cause the processor to select a representative dialogue encoding for each cluster. The computer program instructions, when executed, cause the processor to store message text from the agent response messages associated with each representative dialogue encoding as a response template. The response templates are supplied to a conversational agent for use in generating an agent response message during a text dialogue.

DETAILED DESCRIPTION

Certain examples described herein provide methods, systems and non-transient computer-readable medium containing computer program instructions for generating templates for use by a conversational agent. These examples enable a natural language interface to be efficiently provided, and address some of the issues surrounding response consistency within neural conversational models.

Certain examples described herein cluster messages from a corpus of text data representing conversations or text dialogues. This clustering enables response templates to be generated in a way that takes into account a context in which responses are given.

In certain examples, messages that are exchanged between a user and an agent are embedded as numeric arrays based a neural sequence-to-sequence model. In these examples, an encoding (referred to herein as a "dialogue encoding") may represent information from a given agent response, as well as a history of message exchange prior to the response. Numerical clustering routines, such as k-means clustering, may be used to group dialogue encodings into one or more response clusters, and these clusters may then be used to generate response templates. The response templates may be used by a conversational agent to prepare a response to a current sequence of messages exchanged between a user and the agent.

Certain examples described herein, enable a set of response templates to be bootstrapped from a database of historical data, wherein the response templates facilitate future user interactions with a conversational agent.

The methods described herein may be used in both an offline and online manner, e.g. may be applied to a given set of data once, or may be applied iteratively as data is collected over time. In the latter case, an example system is able to adapt over time, e.g. to possibly expand a set of response templates and/or vary existing response templates to more accurately respond to user queries.

Figure 1A:
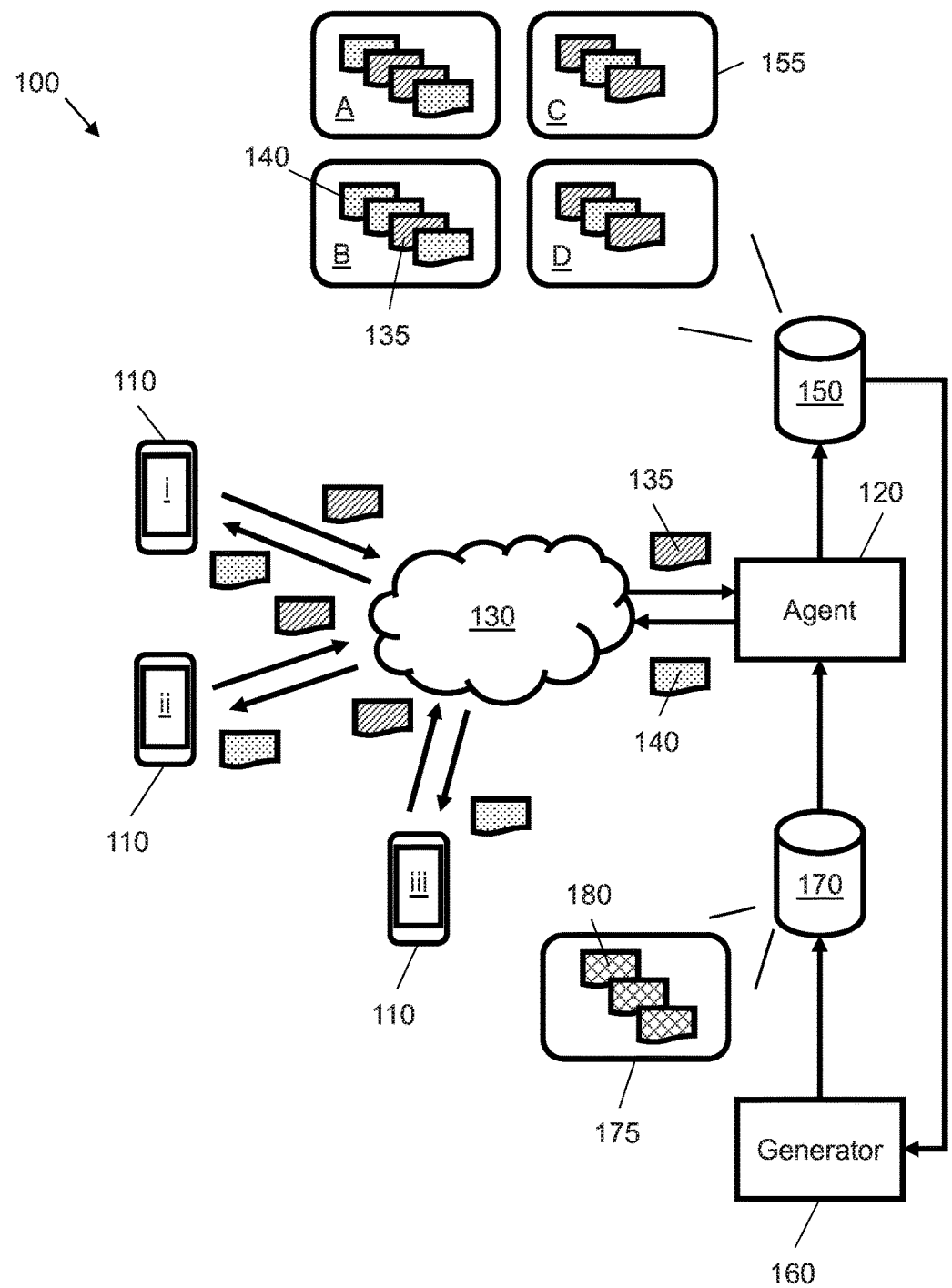
FIG. 1A shows a system for implementing a conversational agent according to an example.

FIG. 1A shows a system for implementing a text dialogue according to an example. FIG. 1A is a schematic diagram that shows certain components to explain the operation of a text dialogue system; it should be noted that certain features may be added, omitted or modified while retaining an underlying functionality as described herein.

FIG. 1A shows conversations, i.e. text dialogues, which are taking place between three example user computing devices 110 and a conversational agent 120. In the present example, the user computing devices 110 are communicatively coupled to the conversational agent 120 using one or more networks 130. The one or more networks 130 may comprise any form or interconnection of networks, e.g. may comprise a public set of interconnected wide area networks such as the Internet and/or one or more private networks. In other examples, the conversational agent 120 need not be communicatively coupled to a user computing device 110 via a network, e.g. the conversational agent 120 may be implemented as part of the user computing device 110. In practice, there may be multiple conversation agents 120, wherein each conversation agent 120 may communicate with a large number of user computing devices 110 (e.g. on a ratio of 1:100+).

The user computing devices 110 may comprise a variety of computing devices including, but not limited to, mobile devices (e.g. smartphones, tablets), embedded devices (e.g. so-called "smart" appliances, or microphone and speaker devices for use with intelligent personal assistants), desktop computers and laptops, and/or server devices. These computing devices comprise at least a processor and memory, wherein computer program code may be stored in the memory and implemented using the at least one processor. The user computing devices 110 may comprise a network interface to couple to the one or more networks 130. This network interface may be a wired and/or wireless interface.

The conversational agent 120 may be implemented upon a server computing device comprising at least one processor and memory. In examples described herein, the functionality of the conversational agent 120 may be implemented, at least in part, by, wherein computer program code stored in the memory and executed upon the at least one processor. Certain aspects of the conversational agent 120 may also be implemented in programmable integrated circuits. The server computing device may also comprise a wired and/or wireless network interface to couple to the one or more networks 130.

In FIG. 1A, messages are exchanged between the user computing devices 110 and the conversational agent 120 over the one or more networks 130. These messages comprise messages sent from a user computing device 110 to the conversational agent 120, shown as user messages 135 in FIG. 1A, and messages sent from the conversational agent 120 to a user computing device 110, shown as agent messages 140 in FIG. 1A. User messages 135 may comprise queries from a user and agent messages 140 may comprise replies or responses to those queries. There need not be a one-to-one query-response pattern to the messages, for example, a conversational agent 120 may send a first message to begin a text dialogue, to which a user may reply with one or more user messages detailing their query, and further to which the conversational agent 120 replies with one or more agent messages. A text dialogue may comprise multiple exchanges of messages backwards and forwards between the user computing device 110 and the conversational agent. For example, a text dialogue may comprise 5-20 messages or more.

Messages may be exchanged over a plurality of differing protocols and mechanisms. Text dialogues may have a single mode (e.g. be based around a single protocol or mechanism) or be multi-modal (e.g. where messages are collated from multiple differing message exchange mechanisms). Example protocols and mechanisms include, amongst others, email, Short-Message Service (SMS) messages, instant messaging systems, web-conferencing, Session Initiation Protocol (SIP) services, Text over Internet Protocol (ToIP) systems, and/or web-based applications (e.g. Hyper Text Markup Language—HTML—data transmission via Hypertext Transfer Protocol—HTTP). Certain messaging systems may be based in the application layer and operate over, for example, transport control protocol (TCP) over Internet Protocol (IP). Messages may be stored and/or managed as part of a Customer Relationship Management (CRM) platform. Text dialogues are typically one-to-one but in certain examples may comprise messages originating from multiple conversational agents and/or users. Text dialogues may be live, e.g. comprise messages exchanged in real-time or near real-time, or may exist over a period of time (e.g. days, weeks or months). Users may be identified via user identifiers such as email addresses, usernames for login credentials, phone numbers and/or Internet Protocol address. A start of a text dialogue may be indicated by a first message exchanged over a given protocol or mechanism, a user or agent initiating a messaging session, and/or a protocol request to start a conversation. An end of a text dialogue may be demarked by a period of inactivity, be closed by a user or agent action and/or be set by the closing of a message exchange session, amongst others.

Although a single conversational agent 120 is shown in FIG. 1A, example systems for implementing a text dialogue may comprise multiple agents, wherein each conversational agent 120 is active in one or more text dialogues at any one time. For example, multiple conversational agents 120 may be implemented as multiple threads on at least one processor of a server computing device.

Returning to the example of FIG. 1A, the conversational agent 120 is communicatively coupled to a dialogue database 150. The dialogue database 150 comprises historical data representing a plurality of text dialogues 155. Each text dialogue comprises a sequence of messages 135, 140 that have been exchanged between a user and a conversational agent. In a multi-agent system, e.g. where multiple conversational agents are communicating with user computing devices, the plurality of text dialogues 155 may comprise text dialogues involving different conversational agents, wherein each conversational agent may have one or more associated text dialogues. As an example, four text dialogues 155 are shown in FIG. 1A: text dialogue A comprises four messages, a first message from an agent to a user, two messages from the user to the agent, and a fourth message from the agent to the user; text dialogue B starts with two messages from an agent, which is followed by a message from a user, and ends with a response message from the agent; and text dialogues C and D start and end with a message from a user, wherein an agent response follows the start message. These are simple examples and actual datasets may comprise different combinations of user and agent messages, as well as different numbers of messages. An implementation of this example may have a dialogue database 150 with thousands or millions of text dialogues.

In the example of FIG. 1A, each message comprises text data. Text data may comprise a sequence of encoded characters that are stored in memory as a byte sequence. Text data may be encoded using one or more standards, e.g. an American Standard Code for Information Interchange (ASCII) or a Unicode encoding (such as UTF-8 or UTF-16). Text data may be stored in plain text format or a structured text format. If text data is stored in a structured text format, raw text data representing messaging text within formatting or markup may be extracted using one or more pre-processing functions. Text dialogues 155 may be stored as files (e.g. formats include plaintext ".txt", JavaScript Object Notation ".json", or extended markup language ".xml") and/or as a series of database rows. In the former case, the dialogue database 150 may comprise one or more storage devices that store one or more files. The dialogue database 150 may comprise an interface that returns text data following a request for a given text dialogue. The text data may be representative of utterances ranging from a single word (e.g.

a character sequence) or short sequence of words (e.g. a sentence) to a paragraph or more of text (e.g. one or more groupings of word sequences).

FIG. 1A also shows a response template generator 160 that is configured to generate response templates for use by the conversational agent 120. The response template generator 160 is communicatively coupled to the dialogue database 150 so as to access the plurality of text dialogues 155 within the dialogue database 150. The response template generator 160 is further communicatively coupled to a template database 170. The template database 170 comprises a response template set 175, i.e. a collection of response templates 180 for use by the conversational agent 120. For example, in FIG. 1A, the conversational agent 120 is communicatively coupled to the template database 170 and may be configured to retrieve one or more response templates 180 from the response template set 175. In one case, the conversational agent 120 may retrieve the response template set 175 as a list of possible responses to use to respond to a received user message 135. In certain case, the conversational agent 120 may select one of the response template set 175 based on a message history for a current text dialogue that requires a response. The conversational agent 120 may use a response template "as is" to provide a response message 140, or may modify the response template 140 to provide the response message 140. In certain cases, a response message 140 may be modified by populating field values that are extracted from message history for a current text dialogue (e.g. a string representing a name of a user may be extracted and inserted into a response template).

The response template generator 160 is configured to use at least a subset of the plurality of text dialogues 155 to generate at least one of the response templates 180 in the response template set 175. Detailed examples of how this may be performed are described with reference to the later Figures. In one case, the response template generator 160 uses a neural sequence-to-sequence model that is trained using data from the dialogue database 150. The trained neural sequence-to-sequence model is used to generate dialogue encodings that are representative of responses provided within a past text dialogue. These dialogue encodings are then grouped, e.g. by applying a clustering routine as implemented by a clustering engine. Dialogue encodings that are representative of each group may then be determined, and the original response text data associated with each representative dialogue encoding may be used as the basis of a response template.

Figure 1B:
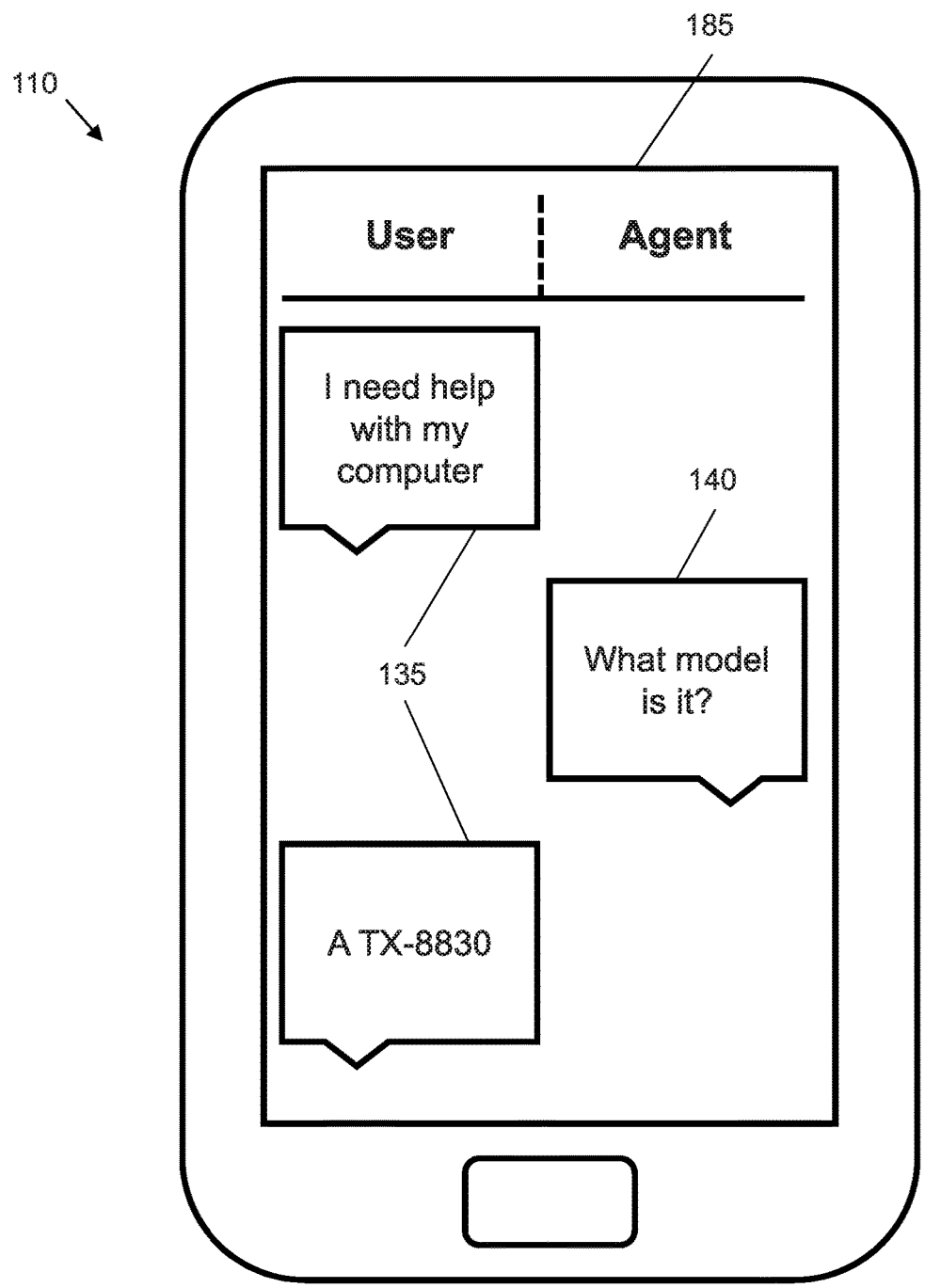
FIG. 1B shows a larger example of a client computing device from FIG. 1A.

FIG. 1B shows an example of how a text dialogue may appear when rendered on a user computing device 110 (in this Figure a smartphone). A user interface 185 displayed on a screen of the user computing device 110 shows messages sent by the user 135 (possibly using the computing device 110) and a response message 140 sent by the conversational agent 120.

Figure 2:
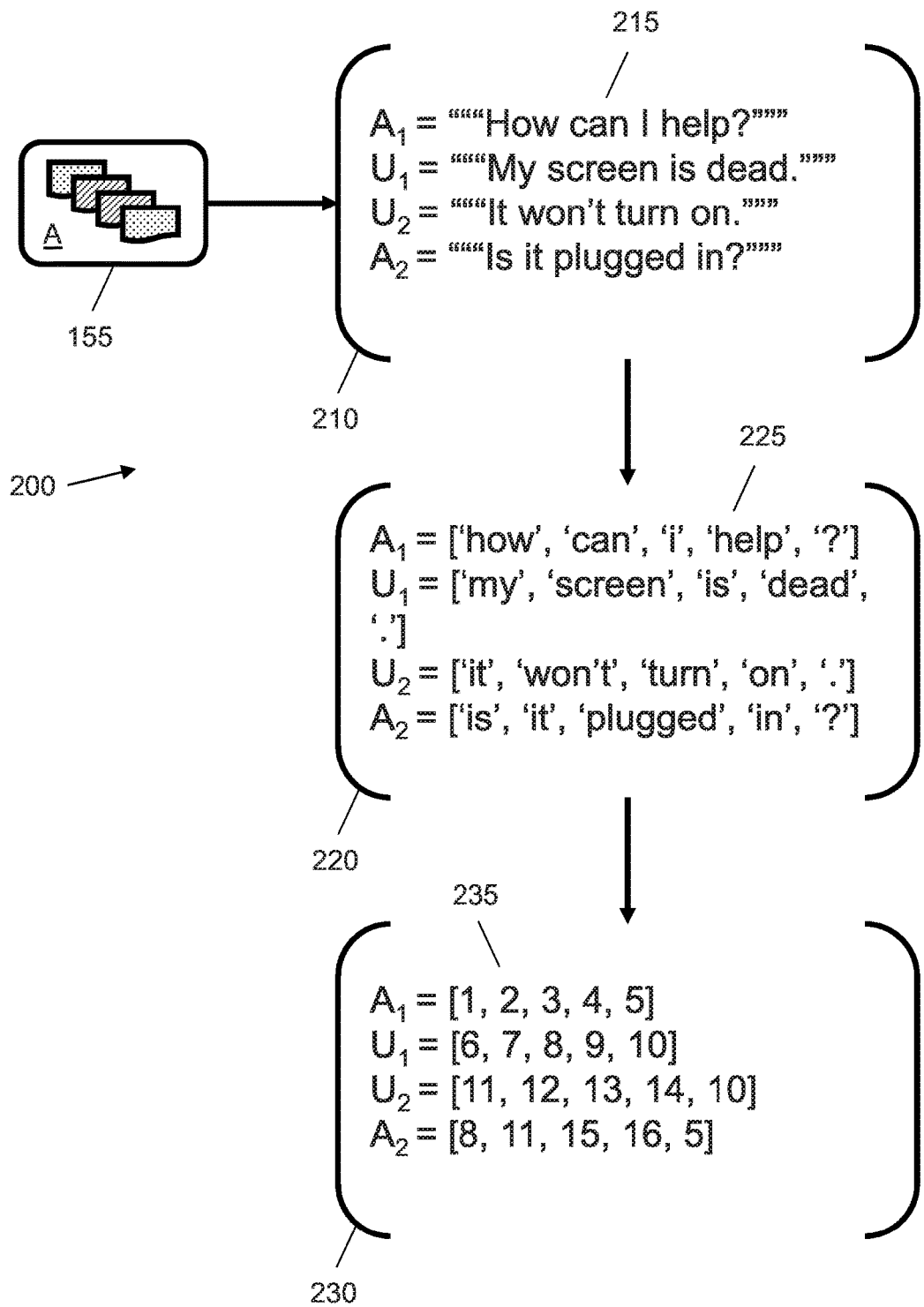
FIG. 2 shows an example of text pre-processing that may be applied to historical data.

FIG. 2 shows examples of how a text dialogue 155 may be stored and pre-processed. FIG. 2 shows an example of text dialogue A from FIG. 1A, which consists of four messages, a first message from an agent to a user, two messages from the user to the agent, and a fourth message from the agent to the user. In this example, the text dialogue 155 is stored on disk as a sequence of strings 210. An order for the sequence of strings 210 may be explicitly indicated (as shown by the variable names $A_i$ and $U_i$ indicating an $i^{th}$ utterance by the Agent or the User) and/or may be implicit, e.g. set by the order of strings in a list or array. In examples other than that shown in FIG. 2, sequential messages from a common party, e.g. $U_1$ and $U_2$ in FIG. 2, may be combined (e.g. concatenated) into a single string. Each string 215 in the sequence of strings 210 may comprise a series of encoded characters. In general, a text dialogue comprises a sequence of text data, where the text data originates from one of a plurality of data sources. In one case, messages may be grouped into pairs of messages representing a query (e.g. from a user) and a response (e.g. from an agent). The text dialogue may then be represented as a sequence of these pairs. In this case, opening messages such as $A_1$ may be omitted from subsequent processing.

In certain examples, each text string 215 may be pre-processed. One method of pre-processing is text tokenization. Text tokenization splits a continuous sequence of characters into one or more discrete sets of characters. The discrete sets of characters may correspond to words or word components in a language. Each discrete set may be referred to as a "term" or "token". A token may be deemed a "word" in certain cases if it matches an entry in a predefined dictionary. One text tokenization method comprises splitting a text string at the location of a white space character, such as " ". FIG. 2 shows an example result of text tokenization performed on the sequence of strings 210 in the form of character set arrays 220. For example, character set array 225—['how', 'can', 'i', 'help', '?']—is generated by tokenizing string 215—"How can I help?". Each character set array may be of a different length. In certain cases, a maximum array length may be set, e.g. as 50 or 100 tokens. In these cases, entries in the array that follow the end of a message may be padded with a special token (e.g. <PAD>).

There are several possible text tokenization implementations, some of which may produce an output that differs from the example of FIG. 2; any of these possible text tokenization implementations may be used with the methods described herein. Other text pre-processing includes converting characters to a single case (e.g. all lowercase), removing certain punctuation or non-printing characters, and/or converting each term to a lemma (a normalised or dictionary form of the term, e.g. "is" may be converted to "be").

In certain examples, text tokens may be converted into a numeric form. For example, a dictionary may be generated that comprises a list or array of all discrete sets of characters that are present following text tokenization of messages in the dialogue database 150. In this case, within the data or for a copy of the data, each unique set of characters, i.e. each token, may be replaced with a numeric value representing an index in the dictionary. In FIG. 2, the character set arrays 220 are converted into variable length numeric arrays 230. In this example, the dictionary has entries: { . . . , "?": 5, . . . , "is": 8, . . . , ".":10, . . . }. Numeric array 235 is generated from character set array 225 as [1, 2, 3, 4, 5]. Each value in the numeric array may be an integer. In certain cases, a threshold may be applied to a token count metric to set the size of the dictionary; e.g. a vocabulary may be limited to 10,000-50,000 tokens, in which case the most common 10,000-50,000 terms may be included in the dictionary and any token that is not in the dictionary is replaced with an out-of-dictionary symbol (e.g. <UNK>). In certain cases, integer values may be converted into a one-hot binary encoding, e.g. an array of binary values equal to the size of the dictionary—where an integer value of "8" is represented by setting the eight entry in the array to "1" and all other entries to "0". These numeric arrays may also be padded, e.g. if required for subsequent processing.

In certain examples, to generate numeric arrays 230, word embeddings may be used. For example, this may be based a feed forward neural network that receives one of the data representations 210, 220, or 230 from FIG. 2 and outputs a fixed-length array of real-values (e.g. 32 bit or 64 bit floats). Each entry in numeric array 235 may thus in this case be represented by a fixed-length array of real-values. The length may be selected to be between 100 and 500. Word embeddings may be implemented using an initial layer of a neural network, such as that used for the neural sequence-to-sequence model, and may be trained together with the rest of the neural network. Alternatively, word embeddings may be computed using pre-trained models, such as those based on the Word2Vec method as described in the paper by Mikolov, Tomas et al, "Efficient Estimation of Word Representations in Vector Space", arXiv:1301.3781, or the GloVe method described in the 2014 paper GloVe: Global Vectors for Word Representation by Jeffrey Pennington, Richard Socher, and Christopher D. Manning.

Figure 3:
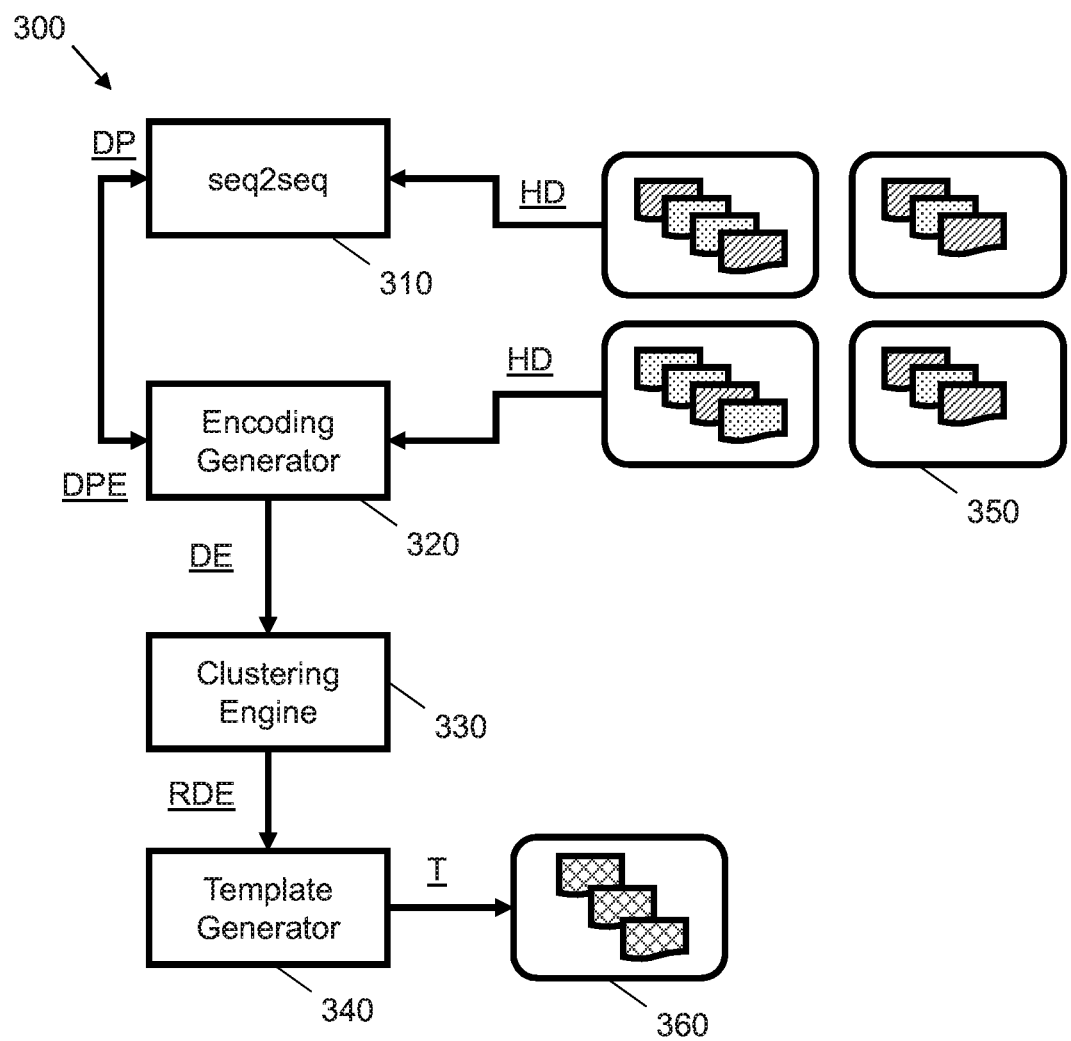
FIG. 3 shows an example of components that may implement the generator of FIG. 1A.

FIG. 3 shows a set of components 300 that may be used to implement the response template generator 160 of FIG. 1A. The components comprise a sequence-to-sequence model 310, an encoding generator 320, a clustering engine 330 and a template generator 340. Each component may comprise at least one processor and memory, wherein functionality of the component may be enacted by retrieving computer program code from the memory and executing said code on the at least one processor. Each component may be implemented on a common server computing device or on separate server computing devices. Each component may be implemented using one or more objects or functions defined in computer program code.

The sequence-to-sequence model 310 and the encoding generator 320 receive historical data 350. For example, this may be retrieved from the dialogue database 150 shown in FIG. 1A. Historical data 350 comprises a plurality of text dialogues as described above. The sequence-to-sequence model 310 is trained using the historical data 350. This may comprise an optimization routine that computes parameter values for the sequence-to-sequence model 310 based on a back propagation routine. The sequence-to-sequence model 310 may be implemented using one or more machine learning libraries of coded functions and classes. The sequence-to-sequence model 310 may be trained using processors from one or more graphical processing units. An example structure and training method for a sequence-to-sequence model is described in more detail below with reference to FIGS. 4A and 4B.

In FIG. 3, the encoding generator 320 generates a dialogue encoding for agent response messages within the historical data 350 using an output of an encoder of the sequence-to-sequence model 310. In one case, the encoding generator 320 retrieves a given text dialogue from the historic data 350 and selects an agent response message from said dialogue. In certain text dialogues, there may be only one agent response message within the dialogue. In these cases, that message is selected. In other cases, there may be multiple agent response messages. In these cases, one or more of the agent response messages may be selected. In certain cases, each agent response message from a text dialogue is processed by the encoding generator 320. An "agent response message" in these cases is taken to be a message that was sent by a conversational agent, such as conversational agent 120 in FIG. 1A, in response to one or more previous messages that are received from a user computing device, wherein the complete set of messages form the text dialogue.

A "dialogue encoding" (DE) comprises a numeric array that represents a particular dialogue. It may be limited to a particular number of entries, e.g. 500, 5000 or 10,000 entries. The numeric array may be real valued, e.g. be made up of 32 or 64 bit float values. It may be stored in memory or on disk.

In one example, the encoding generator 320 uses at least a dialogue prefix encoding (DPE) output by the sequence-to-sequence model 310 to generate the dialogue encoding. A dialogue prefix encoding may be generated by the sequence-to-sequence model 310 based on an input dialogue prefix. A dialogue prefix comprises at least a subset of the sequence of messages in a given text dialogue that precede a given agent response message. In the example of FIG. 2, an agent response message may comprise $A_2$ (e.g. in one of the forms 210, 220, 230) and a dialogue prefix may comprise the sequence $A_1$, $U_1$ and $U_2$. The dialogue prefix may comprise the complete set of messages that precede the agent response message or a selection of the preceding messages (e.g. a set number of messages and/or messages from just one of the user and the agent). The dialogue encoding may result from a function applied to the dialogue prefix encoding by the encoding generator 320. Example functions are discussed in more detail with reference to FIGS. 5A and 5B below.

In FIG. 3, the clustering engine 330 is arranged to receive a plurality of dialogue encodings from the encoding generator 320 and to group the plurality of dialogue encodings into one or more response clusters. The plurality of dialogue encodings may represent all agent response messages within the historical data 350 or a subset of this data. In one case, each text dialogue in the historic data 350 is used to generate at least one dialogue encoding. In cases where a text dialogue comprises multiple agent response messages, a plurality of dialogue encodings may be generated for each text dialogue in the historic data 350 wherein each dialogue encoding in this plurality has a different dialogue prefix, e.g. one dialogue prefix may comprise a first message from a user and a second dialogue prefix may comprise a first and third message from the user and second message from an agent.

The clustering engine 330 is adapted to receive a plurality of numeric arrays and to cluster these arrays into one or more response clusters. The clustering engine 330 may apply a clustering routine such as k-means clustering, fitting Gaussian mixture models, or nearest-neighbor clustering. The clustering routine may be based on a distance between the numeric arrays as points in a n-dimensional space, where n is the array length and/or a distance between the numeric array as nodes in a graph representation. The clustering routine may locate groups by partitioning the n-dimensional space and/or by locating sets of arrays that have a distance or similarity metric that is below a predefined or computed threshold. Other clustering routines include affinity propagation, spectral clustering, agglomerative clustering, density-based clustering, or hierarchical clustering (e.g. balanced iterative reducing and clustering using hierarchies). The clustering engine 330 may generate a list of lists, wherein each sub-list comprises a set of dialogue encodings and represents a response cluster. In certain cases, the clustering engine 330 may generate a list of dialogue encodings that do not fall within a determined cluster.

Figure 6:
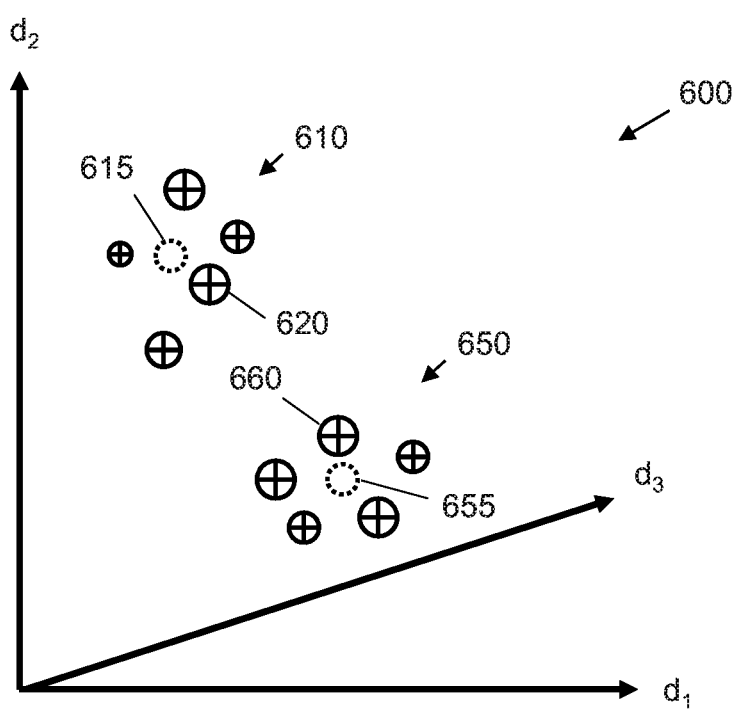
FIG. 6 shows an example visualization of a clustering routine.

In the example of FIG. 3, the clustering engine 330 is configured to output a representative dialogue encoding (RDE) for each response cluster. In FIG. 3, the representative dialogue encodings are received by the template generator 340. A representative dialogue encoding comprises a selection of a dialogue encoding in a response cluster that is deemed representative of the cluster. A representative dialogue encoding may be selected in a variety of ways. In one case, an average dialogue encoding may be computed for the response cluster, and a dialogue encoding that minimizes a distance metric (such as a L or L2 norm—i.e. a "closest" encoding to an average for the group) may be selected as the representative dialogue encoding. In a similar case, a centroid of each cluster in the dialogue encoding space may be computed. In certain cases, this may be the same as the aforementioned average, depending on the chosen average computation. In this case, a dialogue encoding may be selected for each centroid that minimizes a distance metric to the centroid. This process is shown in FIG. 6. In other cases, a component-wise median may be used. Parameters of the clustering engine 330 may be set to trade-off a size of each cluster and a number of dialogue encodings deemed to form part of the cluster.

Returning to FIG. 3, the template generator 340 receives the representative dialogue encodings from the clustering engine 330 and uses them to generate a set of response templates 360. In one case, the template generator 340 retrieves message text from the historic data 350 that is associated with the agent response message corresponding to the representative dialogue encoding and stores this message text as the response template. The association between a representative dialogue encoding and an agent response message may be performed by storing a unique identifier for each agent response message in each text dialogue and by storing this unique identifier together with each dialogue encoding (e.g. as a tuple). The unique identifier may also be stored together with a storage address of the text data. In this way, a mapping between a dialogue encoding and a storage location of an agent response message may be stored. In this case, the template generator 340 may receive the identifier or look up the identifier based on the dialogue encoding value for each representative dialogue encoding. Based on the identifier the storage address of the text data for the agent response message associated with the dialogue encoding may be retrieved. In other case, a look-up table may be used to directly map a dialogue encoding value to a storage address. Other methods of association are also possible.

In this manner, the set of components 300 shown in FIG. 3 generate a set of response templates 360 that may be used by a conversational agent, such as conversational agent 120, to implement a text dialogue. For example, the set of components 300 may process a plurality of text dialogues in historic data (e.g. on a scale of thousands or millions of dialogues) to generate a set of response templates (e.g. in the tens or hundreds). The number of response templates to generate may be supplied as a parameter to the clustering engine 330 to limit the number of clusters that are identified (e.g. k=20 or 50). Following the generation of the set of response templates 360, the conversational agent may be activated to engage in further text dialogues (e.g. be switched to receive incoming user messages). For a received user message, the conversational agent may be presented with the set of response templates 360 for use in generating a reply to the user message. The conversational agent is then able to send an agent response message that is based on the response template in reply to the user message.

In certain cases, the conversational agent may apply further machine learning functions upon messages in a current text dialogue to determine which response template to select. Examples of certain functions are described in more detail later below. As one example of the type of functions that may be applied, a conversational agent may take a set of messages from a current text dialogue (e.g. a live interaction) as a dialogue prefix and send this to the trained sequence-to-sequence model 310 for encoding. The set of response templates and the current dialogue prefix encoding may then be used to generate dialogue encodings for each of the response templates, e.g. by applying the encoding generator 320 to this data. A comparison may then be made between these new dialogue encodings and the representative dialogue encodings associated with each response template. The response template that minimizes a distance metric between its representative dialogue encodings and an associated new dialogue encoding based on the current dialogue prefix may be selected as an appropriate response template. This may indicate that appropriate response template is most suited to the context of the current text dialogue.

Figure 4A:
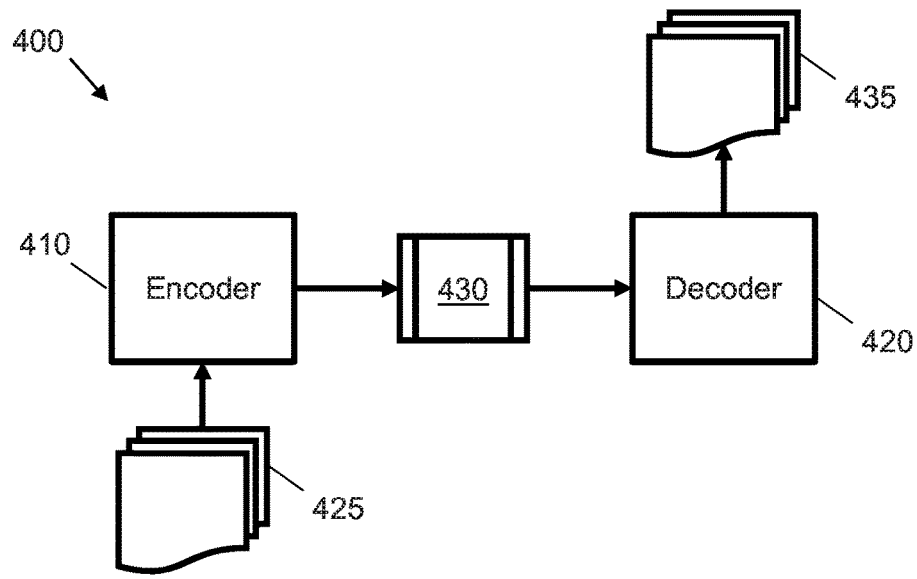
FIG. 4A shows an example sequence-to-sequence model.
Figure 4B:
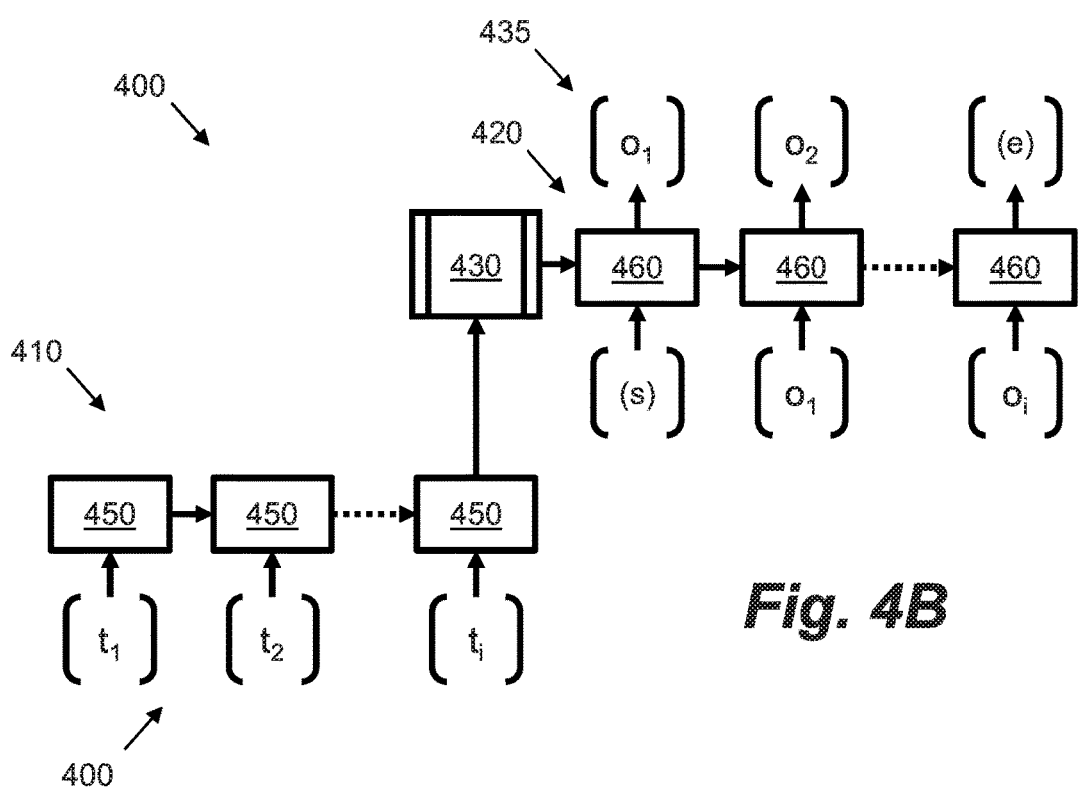
FIG. 4B shows an example sequence-to-sequence model in more detail.

FIGS. 4A and 4B show aspects of an example sequence-to-sequence model 400, as adapted for use with the present examples. These aspects will now be described in more detail.

The present examples may make use of a so-called "neural" sequence-to-sequence model. This means that the sequence-to-sequence model uses neural networks, i.e. processing models that feature interconnected nodes. In many cases, interconnected nodes are modelled using matrices of weights and biases that are multiplied with arrays of input data to generate an output array. Sequence-to-sequence models may use multiple layers of interconnected nodes, where an output of one layer forms the input for another layer.

FIG. 4A shows a neural sequence-to-sequence model 400 comprising an encoder 410 and a decoder 420. The encoder 410 receives a sequence of tokens as an input 425 and encodes the sequence of tokens as a numeric array 430. This numeric array 430 is sometimes referred to as a "hidden" array of values, as it represents values for a set of latent or hidden variables. The decoder 420 receives the numeric array 430 and generates a sequence of tokens as an output 435.

In the present case, the input 425 is derived from a dialogue prefix of a text dialogue. For example, tokens from the text of a dialogue prefix may be passed as the input 425. These tokens may comprise tokenized "words" or characters. For example, they may comprise the joined lists of $A_1$, $U_1$, $U_2$ in FIG. 2 (e.g. in numeric form as per 230 or in token form 220 depending on the pre-processing that is applied). Many sequence-to-sequence models are configured to receive a sequence of real valued arrays as representations of tokens, e.g. where each input is an array of 32 or 64 bit float values. In these cases, an input 425 may be provided as one-hot arrays for "words" or characters from a word or character dictionary, or an embedding layer may be used in the form of a feed forward neural network that projects the one-hot arrays to a lower-dimensionality real valued space.

FIG. 4B shows the example sequence-to-sequence model 400 in more detail. The encoder 410 and decoder 420 are constructed from chains of sub-units that receive a token as input and produce an output. The encoder 410 comprises encoding sub-units 450 and the decoder 420 comprises decoding sub-units 460. In one example, the encoder 410 and the decoder 420 are based on a recurrent neural network. In this case, the encoding sub-units 450 may comprise a recurrent neural network in the form of a different time phases of a Long Short Term Memory (LSTM) or different time phases of a Gated Recurrent Unit (GRU). These recurrent neural networks output a hidden layer value and an output value at each time or point in a sequence; wherein, the value of the hidden layer at the end of the sequence forms the hidden array 430, and forms a hidden layer input for the decoder 420.

In practice an untrained sequence-to-sequence model may be constructed by assembling computer program code, e.g. from machine learning libraries in programming languages such as Python, Java, Lua or C++. The model may be applied to training data by executing this computer program code on one or more processors, such as groups of central processing units or graphical processing units. Following training, a trained sequence-to-sequence model may comprise computer program code as executed by a processor and a set of stored parameter values that parameterize (i.e. result in) a specific model configuration.

In present examples, the hidden array 430 may be used as a response context encoding that is used to generate the dialogue encoding. For example, an untrained sequence-to-sequence model may be trained on tokens from a dialogue prefix of a given text dialogue as the input tokens $t_i$ as shown in FIG. 4B. Training consists of optimizing an error between an output 435 of the decoder 420, i.e. tokens $o_i$ in FIG. 4B and tokens of the agent response message that follows the dialogue prefix in the given text dialogue. For example, from FIG. 2, the joined set of tokens from $A_1$, $U_1$, $U_2$ may be applied as input tokens $t_i$ and the set of tokens from $A_2$ may be used as a ground truth for comparison with the output tokens $o_i$. The training of the sequence-to-sequence model may attempt to minimize an objective function, such as a cross-entropy between the ground truth (e.g. in the form of $A_2$) and the output 435 of the decoder (e.g. $o_i$). Training may be repeated for a plurality of text dialogues in this manner (e.g. for all agent response messages and dialogue prefixes that may be extracted from the dialogue database 150). During training the output of the encoder 410 may be discarded. While training, a given output i of the decoder 435 may be used as the input to the decoder 435 for the next token (e.g. time i+1), or the ground truth token at time i may be fed as the next decoder input. In certain cases, a comparison may be made by applying a softmax function to an output of the decoder 420 and comparing this with one-hot encodings of the ground truth tokens.

Training the sequence-to-sequence model 400 results in a set of parameters for the encoder 410 and the decoder 420. Training may apply several iterations over the data, e.g. over data in the dialogue database 150 or historical data 350. In the present examples, the parameters for the encoder 410 following training, e.g. at least weights that are applied to a given input token and the previous hidden array value, are used to encode the dialogue prefixes for generation of dialogue encodings. It should be noted that the subsequent encoding, e.g. as used by the encoding generator 320, may differ from the encoding used for a dialogue prefix during training, as data from the plurality of text dialogues is used to determine the encoder parameters as used by the encoding generator 320, whereas during training the encoder parameters may not yet be suitably optimized.

Certain examples as described herein address a problem of sequence-to-sequence models generating unusable (e.g. incoherent) or inconsistent outputs by using the encoder of the trained model to embed the context of an agent response message and then to cluster based on that embedded context to identify archetypical agent response messages from a large corpus of such messages, these archetypical agent response messages being used to form a response to a user message as opposed to the output of the decoder.

Figure 5A:
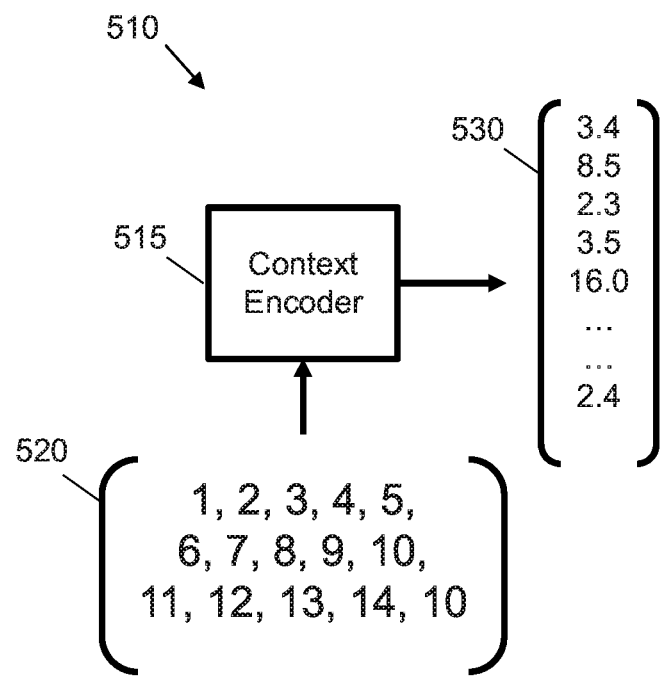
FIGS. 5A and 5B respectively show examples of a context encoder and a content encoder.
Figure 5B:
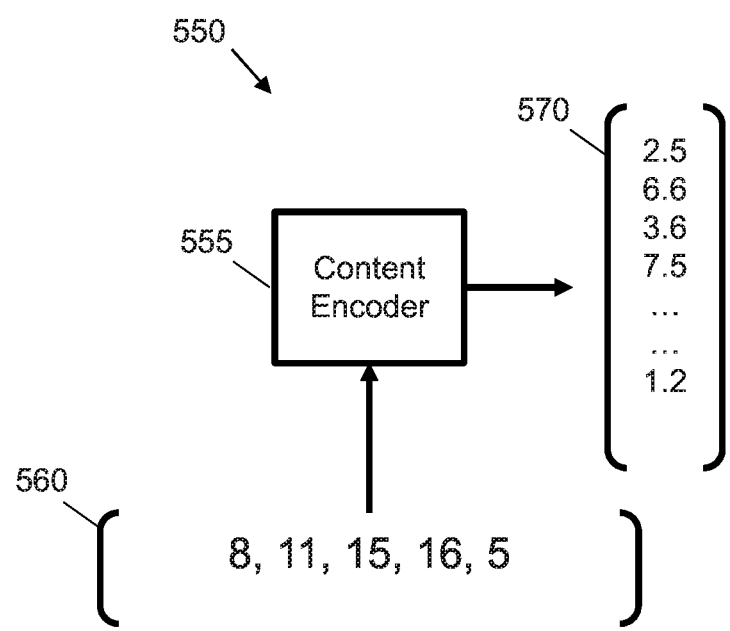

FIGS. 5A and 5B show sub-components 510, 550 that may be used to implement the encoding generator 320.

FIG. 5A shows a response context encoder 515 to encode a dialogue prefix 520 from a text dialogue using an encoder of a trained neural sequence-to-sequence model to generate a response context encoding 530. The operation of the response context encoder 515 has been described above. FIG. 5B shows a response content encoder 555 to encode an agent response message 560 following the dialogue prefix 520 in the text dialogue as a numeric array to generate a response content encoding 570. Both the response context encoding 530 and the response content encoding 570 are then used to form the dialogue encoding. This enables aspects of an agent response message, and aspects of the context of the agent response message, to be encoded.

In one case, the response context encoding 530 and the response content encoding 570 are fused to generate a single numeric array for use as the dialogue encoding for the text dialogue. In one case, fusing may be applied by concatenating the response context encoding 530 and the response content encoding 570.

In certain examples, the content encoder 555 processes the tokens (e.g. "words" or characters) of an agent response message following a dialogue prefix to generate the response content encoding 570. In one case, the content encoder 555 may implement a token count for tokens within a predefined fixed-length vocabulary array. The vocabulary array of length n may comprise a dictionary of the top n−1 tokens following tokenization of the complete set of text dialogues, plus an out-of-dictionary token. In another case, possibly using the token count, the content encoder 55 may compute a term-frequency document-inverse-frequency (TF-IDF) count for tokens within the predefined fixed-length vocabulary array. In another case, an Okapi BM25 representation may be used, or other similar text processing metrics. In yet another case, the content encoder 555 may compute word embedding values for each of the sequence of tokens (e.g. using known word2vec or GloVe library routines or stored pre-trained values) and compute the response content encoding 570 as a function of these word embedding values. One function may be a mean word embedding value for the set of tokens forming part of the agent response message.

In certain cases, the response context encoding 530 and the response content encoding 570 may have different lengths. For example, the response context encoding 530 may have a length based on a dimensionality of a hidden layer of a recurrent neural network (e.g. 300 to 1000 values) and the response content encoding 570 may have a length based on a dimensionality of a fixed-length vocabulary array (e.g. 10,000 to 50,000 values). This may result in issues during fusion, as one encoding (e.g. the response content encoding 570) may dominate the dialogue encoding and subsequent clustering. To address this the encoding generator 320 may be configured to weight and normalize the response context encoding 530 and the response content encoding 570 before fusing. For example, a weight ratio $\alpha/\beta$ may be determined, wherein the values of the response context encoding 530 are multiplied by a normalization factor comprising the weight $\alpha$ divided by a norm (e.g. L1 or L2) of the response context encoding 530. Similarly, the values of the response content encoding 570 are multiplied by a normalization factor comprising the weight $\beta$ divided by a norm (e.g. L1 or L2) of the response content encoding 570. The weighted and normalized values of both encodings may then be concatenated. In other cases, other normalization and/or weighting routines may be applied, e.g. dimensionality reduction (e.g. via principal component analysis or a feed forward network) may be applied to the response content encoding 570 and the response context encoding 530 may be forward projected into a sparse space.

FIG. 6 shows a schematic visualization of a very small three-dimensional dialogue encoding space 600. Each dialogue encoding is represented as a circle with a cross (ten are shown in the Figure). The dialogue encodings in this Figure are seen to form two clusters 610 and 650. A centroid of each cluster is shown as a dotted circle. As such, dialogue encoding 620 may be selected as a representative dialogue encoding for cluster 610 as it is closest to the centroid 615 and dialogue encoding 660 may be selected as a representative dialogue encoding for cluster 650 as it is closest to the centroid 665.

In one example, the conversational agent 120 as shown in FIG. 1A may comprise an answer selection agent. For example, the conversational agent 120 may comprise at least one processor to execute computer program code retrieved from memory to implement an answer selection engine. In this example, the conversational agent 120 receives a query from a user of a user computing device 110 in the form of a user message 135. The conversational agent 120 is configured to rank the response templates 180 in the response template set 175 and access a top ranking response template for use in generating a response message 140. In this example, a configuration of the answer selection engine for the conversational agent 120 may be designed independently of the response template set 175, wherein the response template set 175 may be provided via the components shown in FIG. 3.

One example answer selection engine may compare a vector embedding of the user message 135 and vector embeddings of each of the response templates 180 in the response template set 175, e.g. using a similarity function that takes both the user message and response template embeddings as an input. The similarity function may be a cosine similarity function or the like. Vector embeddings of the user message 135 and the response templates 180 may be generated using a variety of methods. One example method uses one or more neural network encodings of the text of the message or template. The neural network may comprise one of a recurrent neural network, a feed forward neural network (also known as a multi-layer perceptron), and a convolutional neural network. In one case, a bi-directional recurrent neural network representation may be combined with a feed forward neural network representation to generate the vector embedding. An attention mechanism may also be used, wherein values from the vector embedding of the user message 135 may be used to apply weights to an output of a recurrent neural network encoding of the response template. In this case, a response template 180 that maximizes the similarity function may be selected to generate response message 140.

In other examples, the conversational agent 120 may implement other information retrieval functions based on the user message 135 and the response template set 175. These generally compute a representation of the user message 135 and a representation of each response template 180 and input these representations into a similarity function that outputs a similarity metric. The similarity metric may then be used to rank the response templates 180 in the response template set 175 as described above. The similarity function may be based on a distance and/or angle between the representations. In one case, representations may be based on term (i.e. character pattern) occurrences, whether those be based on binary measures (e.g. presence in the text), count (e.g. number of times the term occurs in the text) or a term frequency-inverse document frequency metric.

In one example, the conversational agent 120 may implement a Siamese adaption of an LSTM network, e.g. as described in the paper Siamese Recurrent Architectures for Learning Sentence Similarity by Jonas Mueller and Aditya Thyagarajan, Proceedings of the Thirtieth AAAI Conference on Artificial Intelligence. In this case, a vector representation of each of two text pairs may be generated, in the form of the user message 135 and the response template 180. The Siamese adaption uses two LSTM networks, one to encode each of the user message 135 and the response template 180, where the two LSTM networks share weights. Each encoding may be taken as the hidden state of the LSTM network following the last token in each text string. An output of the architecture may be used as a similarity metric.

Certain examples described herein may enable an answer database for an answer selection engine to be quickly and efficiently constructed. In this case, having an accurate response template set 175 that covers a range of possible answers increases a quality of the conversational agent 120.

Figure 7:
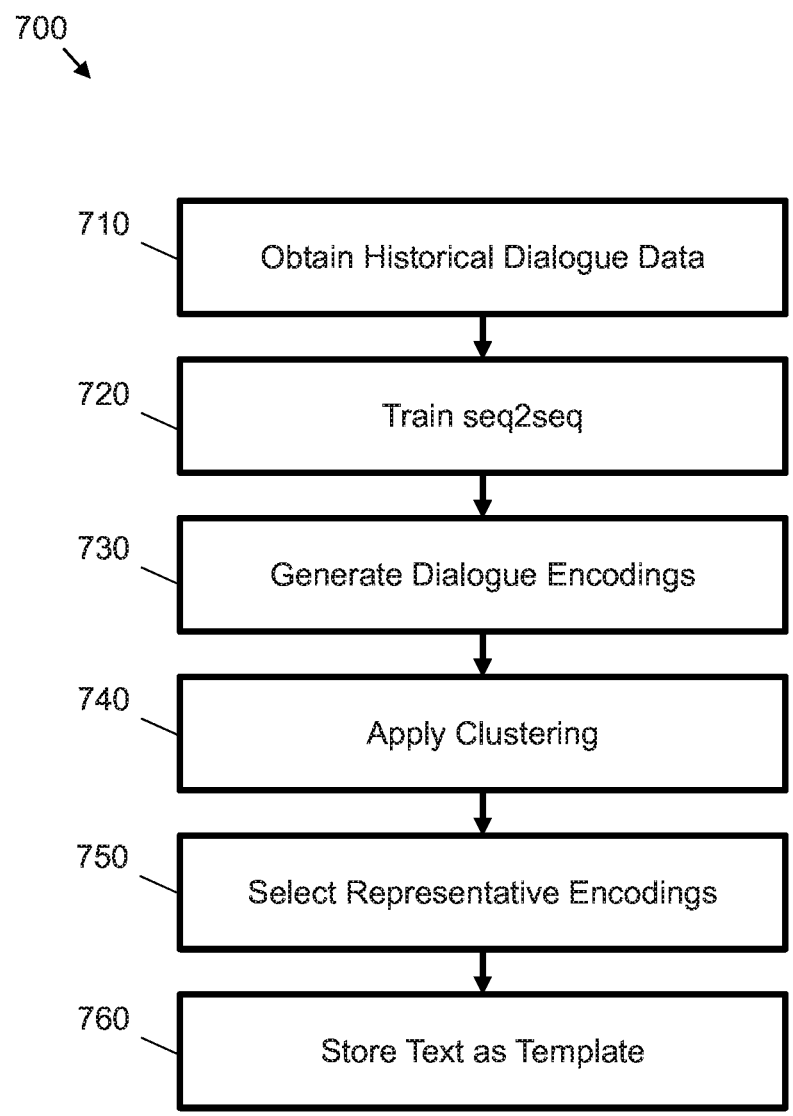
FIG. 7 shows a method for generating response templates for a conversational agent according to an example.

FIG. 7 shows a flow chart of a computer-implemented method 700 for generating response templates for a conversational agent. For example, this method may be applied using the system 100 of FIG. 1A and/or the components 300 of FIG. 3. The method comprises a first block 710 of obtaining historical data representing a plurality of text dialogues. As described above, each text dialogue comprises a sequence of messages exchanged between a user and a conversational agent and each message comprises text data. At block 720, a neural sequence-to-sequence model is trained using the historical data. As described with reference to FIGS. 4A and 4B, the neural sequence-to-sequence model may comprise an encoder and a decoder, the encoder receiving a sequence of tokens as an input and encoding the sequence of tokens as a numeric array, the decoder receiving the numeric array and generating a sequence of tokens as an output. The training may include for a given text dialogue supplying text from a dialogue prefix as the input to the neural sequence-to-sequence model and supplying text from a next message following the dialogue prefix as a ground truth for comparison with the output of the neural sequence-to-sequence model. This may be repeated for the plurality of text dialogues, wherein the dialogue prefix comprises at least a subset of the sequence of messages in a given text dialogue and the next message comprises a given agent response message.

At block 730, dialogue encodings are generated for agent response messages within the plurality of text dialogues using at least dialogue prefix encodings output by the encoder of the trained neural sequence-to-sequence model. At block 740, a clustering routine is applied to group the plurality of dialogue encodings into one or more response clusters. At block 750, a representative dialogue encoding is selected for each cluster, and at block 760 message text from the agent response messages associated with each representative dialogue encoding is stored as a response template. The response templates may then be supplied to a conversational agent for use in generating an agent response message during a text dialogue.

In certain examples, block 730 further comprises encoding a dialogue prefix from the text dialogue using the encoder of the trained neural sequence-to-sequence model to generate a response context encoding and encoding an agent response message following the dialogue prefix in the text dialogue as a numeric array to generate a response content encoding, wherein the response context encoding and response content encoding are fused to generate a single numeric array for use as the dialogue encoding. This fusing may involve normalizing each of the response context encoding and response content encoding and multiplying the normalized encodings by respective normalization ratio weights. Fusing may also or alternatively comprise feeding the context and content encoding as inputs to a feed forward neural network. In certain cases, one or more of encoding a dialogue prefix and encoding an agent response message comprises tokenizing the text data into a sequence of tokens and computing a function of the sequence of tokens. The function may comprise at least one of a token count for tokens within a predefined fixed-length vocabulary array, a term-frequency document-inverse-frequency count for tokens within a predefined fixed-length vocabulary array, and a function of word embedding values for each of the sequence of tokens.

In certain examples, block 750 comprises determining a centroid of each cluster in the dialogue encoding space, and, for each centroid, selecting a dialogue encoding that minimizes a distance metric to the centroid.

The method 700 may subsequently comprise receiving a set of messages for a text dialogue, selecting a response template from the response templates to generate an agent response message to reply to the last user message in the text dialogue, and sending the agent response message to the user.

Figure 8:
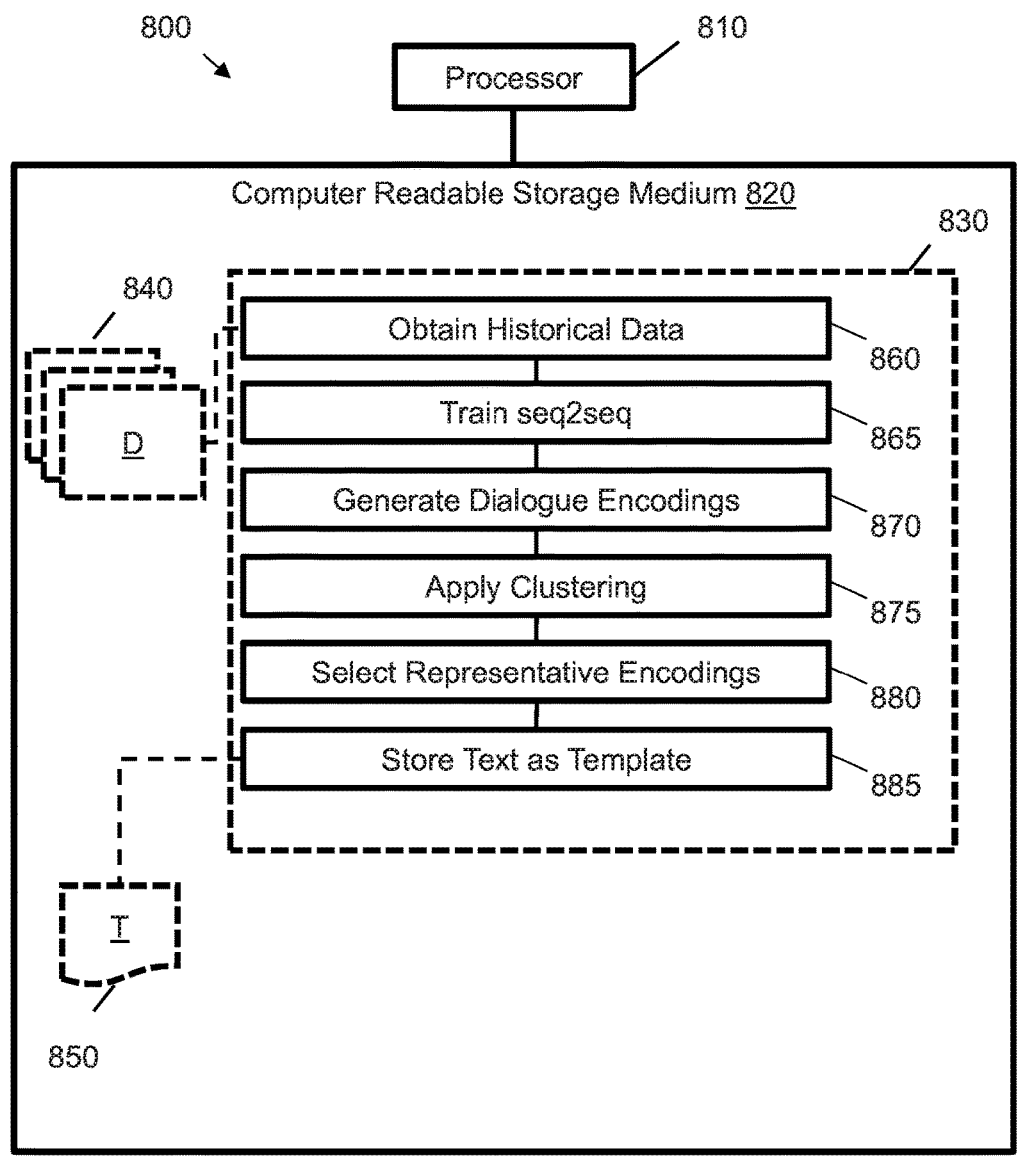
FIG. 8 shows a non-transient, computer-readable medium containing computer program instructions according to an example.

FIG. 8 shows an example 800 of a processor 810 coupled to a non-transitory computer storage medium 820. The non-transient computer-readable medium 820 contains computer program instructions 830 to cause the processor 810 to perform a number of operations. These operations are performed on historical data 840 representing a plurality of text dialogues to generate a set of response templates 850, e.g. in the form of text strings or text files. Via instruction 860, the historical data 840 is obtained. Via instruction 865, a neural sequence-to-sequence model is trained using the historical data 840. The neural sequence-to-sequence model may be of the form described above. Via instruction 870, dialogue encodings are generated for agent response messages within the plurality of text dialogues using at least dialogue prefix encodings output by the encoder of the trained neural sequence-to-sequence model. Via instruction 875, a clustering routine is applied to group the plurality of dialogue encodings into one or more response clusters. Via instruction 880, a representative dialogue encoding for each cluster is selected. Lastly, via instruction 885, message text from the agent response messages associated with each representative dialogue encoding is stored as a response template within the set of response templates 850, wherein the response templates are supplied to a conversational agent for use in generating an agent response message during a text dialogue.

The above examples are to be understood as illustrative. Further examples are envisaged. For example, variations to the sequence-to-sequence model for the context encoding may include use of a bi-directional recurrent neural network to generate the hidden array and/or the use of highway connections. Convolutional neural networks may also be applied to generate a context and/or content encoding. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the disclosure, which is defined in the accompanying claims.

What is claimed is:

1. A computer-implemented method for generating response templates for a conversational agent, the method comprising:

obtaining historical data representing a plurality of text dialogues, each text dialogue comprising a sequence of messages exchanged between a user and the conversational agent, each message comprising text data;

training a neural sequence-to-sequence model using the historical data, the neural sequence-to-sequence model comprising an encoder and a decoder, the encoder receiving a sequence of tokens as an input and encoding the sequence of tokens as a numeric array, the decoder receiving the numeric array and generating another sequence of tokens as an output, wherein said training includes, for a given text dialogue of the plurality of text dialogues:

supplying text from a dialogue prefix as the input to the neural sequence-to-sequence model, the dialogue prefix comprising at least a subset of the sequence of messages in the given text dialogue, and supplying text from a next message following the dialogue prefix as a ground truth for comparison with the output of the neural sequence-to-sequence model;

generating dialogue encodings for agent response messages within the plurality of text dialogues using at least dialogue prefix encodings output by the encoder of the trained neural sequence-to-sequence model;

applying a clustering routine to group the plurality of dialogue encodings into one or more response clusters;

selecting a representative dialogue encoding for each response cluster; and storing message text from the agent response messages associated with each representative dialogue encoding as a response template, wherein the response templates are supplied to the conversational agent for use in generating an agent response message during a text dialogue of the plurality of text dialogues, and wherein generating dialogue encodings comprises, for each text dialogue: encoding a dialogue prefix from the text dialogue using the encoder of the trained neural sequence-to-sequence model to generate a response context encoding;

encoding an agent response message following the dialogue prefix in the text dialogue as a numeric array to generate a response content encoding; and fusing the response context encoding and response content encoding to generate a single numeric array for use as the dialogue encoding for the text dialogue.

2. The method of claim 1, wherein fusing the response context encoding and response content encoding comprises normalizing each of the response context encoding and response content encoding and multiplying the normalized encodings by respective normalization ratio weights.

3. The method of claim 1, wherein encoding an agent response message comprises:

tokenizing the text data of the agent response message into a sequence of tokens; and computing a function of the sequence of tokens.

4. The method of claim 3, wherein the function comprises at least one of:

a token count for tokens within a predefined fixed-length vocabulary array;

a term-frequency document-inverse-frequency count for tokens within a predefined fixed-length vocabulary array; and a function of word embedding values for each of the sequence of tokens.

5. The method of claim 1, wherein selecting a representative dialogue encoding for each cluster comprises:
determining a centroid of each cluster in the dialogue encoding space; and
for each centroid, selecting a dialogue encoding that minimizes a distance metric to the centroid.

6. The method of claim 1, comprising:
receiving a set of messages for a text dialogue of the plurality of text dialogues;
selecting a response template from the response templates to generate an agent response message to reply to the last user message in the text dialogue; and
sending the agent response message to the user.

7. The method of claim 1, wherein the encoder and the decoder of the sequence-to-sequence model comprise a recurrent neural network.

8. The method of claim 1, wherein each message comprises text data in the form of a sequence of encoded characters that are stored in memory as a byte sequence.

9. A system for implementing a text dialogue, comprising:
a conversational agent comprising at least a processor and a memory to receive one or more user messages from a client device over a network and send agent messages in response to the one or more user messages;
a template database comprising response templates for use by the conversational agent to generate the agent messages;
a dialogue database comprising historical data representing a plurality of text dialogues, each text dialogue comprising a sequence of messages exchanged between a user and a conversational agent, each message comprising text data;
a trained sequence-to-sequence model comprising an encoder and a decoder, the encoder receiving a sequence of tokens as an input and encoding the sequence of tokens as a numeric array, the decoder receiving the numeric array and generating another sequence of tokens as an output, the sequence-to-sequence model being trained using text from a dialogue prefix as the input, the dialogue prefix comprising at least a subset of the sequence of messages in a given text dialogue of the plurality of text dialogues, and text from a next message following the dialogue prefix as a ground truth for comparison with the output;
a dialogue encoding generator comprising at least a processor and a memory to generate dialogue encodings for agent response messages within the plurality of text dialogues using at least dialogue prefix encodings output by the encoder of the trained neural sequence-to-sequence model;
a clustering engine comprising at least a processor and a memory to group the plurality of dialogue encodings into one or more response clusters and output a representative dialogue encoding for each response cluster; and
a response template generator comprising at least a processor and a memory to receive representative dialogue encodings for the one or more response clusters and to store message text from the agent messages associated with each representative dialogue encoding as one of the response templates in the template database;
wherein the dialogue encoding generator further comprises:
a response context encoder to encode a dialogue prefix from a text dialogue of the plurality of text dialogues using the encoder of the trained neural sequence-to-sequence model to generate a response context encoding; and
a response content encoder to encode an agent response message following the dialogue prefix in the text dialogue as a numeric array to generate a response content encoding;
wherein the dialogue encoding generator is configured to fuse the response context encoding and response content encoding to generate a single numeric array for use as the dialogue encoding for the text dialogue.

10. The system of claim 9, wherein the dialogue encoding generator is configured to weight and normalize the response context encoding and the response content encoding before fusing.

11. The system of claim 9, wherein the clustering engine is configured to determine a centroid of each cluster in the dialogue encoding space and select a dialogue encoding for each centroid that minimizes a distance metric to the centroid.

12. The system of claim 9, wherein the trained sequence-to-sequence model comprises numeric data representing parameter values for a recurrent neural network.

13. A non-transient, computer-readable medium comprising computer program instructions that, when executed, cause a processor to:
obtain historical data representing a plurality of text dialogues, each text dialogue comprising a sequence of messages exchanged between a user and a conversational agent, each message comprising text data;
train a neural sequence-to-sequence model using the historical data,
the neural sequence-to-sequence model comprising an encoder and a decoder, the encoder receiving a sequence of tokens as an input and encoding the sequence of tokens as a numeric array, the decoder receiving the numeric array and generating another sequence of tokens as an output,
the instructions including instructions to, for a given text dialogue of the plurality of text dialogues:
use text from a dialogue prefix as the input to the neural sequence-to-sequence model, the dialogue prefix comprising at least a subset of the sequence of messages in the given text dialogue, and
use text from a next message following the dialogue prefix as a ground truth for comparison with the output of the neural sequence-to-sequence model;
generate dialogue encodings for agent response messages within the plurality of text dialogues using at least dialogue prefix encodings output by the encoder of the trained neural sequence-to-sequence model;
apply a clustering routine to group the plurality of dialogue encodings into one or more response clusters;
select a representative dialogue encoding for each response cluster; and
store message text from the agent response messages associated with each representative dialogue encoding as a response template,
wherein the response templates are supplied to the conversational agent for use in generating an agent response message during a text dialogue of the plurality of text dialogues, and
wherein generating dialogue encodings comprises, for each text dialogue:
encoding a dialogue prefix from the text dialogue using the encoder of the trained neural sequence-to-sequence model to generate a response context encoding;

encoding the agent response message following the dialogue prefix in the text dialogue as a numeric array to generate a response content encoding; and fusing the response context encoding and response content encoding to generate a single numeric array for use as the dialogue encoding for the text dialogue.

\* \* \* \* \*